United States Patent [19]

Kobayashi et al.

[11] Patent Number: 5,442,718
[45] Date of Patent: Aug. 15, 1995

[54] APPARATUS AND METHOD FOR STORING AND REPRODUCING DIGITAL IMAGE DATA YIELDING HIGH RESOLUTION AND HIGH QUALITY VIDEO IMAGE DATA

[75] Inventors: Hideki Kobayashi; Yasuo Ido, both of Kanagawa, Japan

[73] Assignee: Sony Corporation, Tokyo, Japan

[21] Appl. No.: 114,168

[22] Filed: Sep. 1, 1993

[30] Foreign Application Priority Data

Sep. 7, 1992 [JP] Japan .................. 4-264231

[51] Int. Cl.[6] .............................................. G06K 9/00
[52] U.S. Cl. ........................... 382/166; 348/393; 358/525; 358/539; 382/233; 382/300
[58] Field of Search ............... 382/56, 47; 358/512, 358/525, 539; 395/128, 131; 348/393, 395, 403

[56] References Cited

U.S. PATENT DOCUMENTS

| | | | |
|---|---|---|---|
| 4,660,081 | 4/1987 | Heerah | 358/160 |
| 4,823,201 | 4/1989 | Simon et al. | 358/133 |
| 5,053,861 | 10/1991 | Tsai et al. | 358/525 |
| 5,065,229 | 11/1991 | Tsai et al. | 358/525 |
| 5,172,227 | 12/1992 | Tsai et al. | 358/539 |
| 5,287,188 | 2/1994 | Saeger et al. | 348/565 |

*Primary Examiner*—Leo H. Boudreau
*Attorney, Agent, or Firm*—William S. Frommer; Alvin Sinderbrand

[57] ABSTRACT

An apparatus for processing image data. The apparatus converts analog green image data signals, analog red image data signals, and analog blue image data signals generated by imaging an object. The third image generation elements, representing the green image data, are arranged at positions shifted by a half pitch to the first and second image generation elements. The analog image data signals are converted into digital image data signals and are then compressed at a predetermined compression rate and stored in a recording medium by a storage means. In reproducing the image data, the recorded image data is read from the recording medium and expanded at a predetermined expansion rate to generate data substantially the same as the image data signals before compression. The expanded data is interpolated in a predetermined interpolation manner.

53 Claims, 7 Drawing Sheets

FIG. 2

| G | | G | | G | | G | | G | | G | |
|---|---|---|---|---|---|---|---|---|---|---|---|
| | R/B | | R/B | | R/B | | R/B | | R/B | | R/B |
| G | | G | | G | | G | | G | | G | |
| | R/B | | R/B | | R/B | | R/B | | R/B | | R/B |
| G | | G | | G | | G | | G | | G | |
| | R/B | | R/B | | R/B | | R/B | | R/B | | R/B |

# APPARATUS AND METHOD FOR STORING AND REPRODUCING DIGITAL IMAGE DATA YIELDING HIGH RESOLUTION AND HIGH QUALITY VIDEO IMAGE DATA

BACKGROUND OF THE INVENTION

1. Field of the Invention

The present invention relates to a method of processing image data obtained by an imaging device and to an image data processing apparatus thereof. More particularly the present invention relates to an image data processing apparatus wherein image data is digitally processed and the resultant image data is stored in a recording medium, and to a method thereof.

2. Description of the Related Art

U.S. Pat. No. 4,541,016 discloses an electronic still camera in which an imaging device such as a solid state image sensor generates analog image data and the generated analog image data is recorded on a magnetic disc in an analog signal form. Such electronic still cameras provide a picture of the same as quality that in silver-halide-photography type cameras. Since the image data is recorded on a magnetic disc, the imagery produced by the electronic still camera inevitably suffers from jitter and resultant color stain (mixture). As a result, the reproduced image it suffers from the disadvantages of a low resolution and a low quality of the picture. Also, it suffers from the disadvantage of a large memory capacity required for storing the analog image data.

SUMMARY OF THE INVENTION

An object of the present invention is to provide a method of processing image data by which generation of jitter in processed image data and the resultant color stain (mixture) in the picture are prevented and to thereby to provide pictures of a high resolution and a high quality.

Another object of the present invention is to provide a method of processing image data which enables storage of a large amount of original image data with a small memory.

Still another object of the present invention is to provide an image processing apparatus using the above methods.

According to the present invention, there is provided an apparatus for processing an image data signal formed by at least three color components, including a conversion unit for converting analog intensities of the color component data of the image data signal to digital intensity color component data, a compression unit for compressing the digital color component data of the image data signal converted by the conversion unit at a predetermined rate including a compression rate of 1/1, and a storage unit for storing the compressed digital color component data of the image data signal by the compression means in a digital recording medium.

Further, according to the present invention, there is provided an apparatus for processing image data signal which has moreover a data reading unit for reading the digital color component data of the image data signal from the recording medium, an expansion unit for expanding the digital color component data of the image data signal read from the recording medium at a predetermined expansion rate, to reproduce expansion data substantially the same as the data before the compression, and an interpolating unit for generating data interpolating the digital color component data of the image data signal expanded by the expansion unit in a predetermined interpolation manner, to thereby provide reproduction image picture data having a predetermined resolution.

Further, according to the present invention, there is provided an apparatus for processing image data signal formed by at least three color components including a conversion unit for converting analog intensities of the color component data of the image data signal to digital intensity color component data, an interpolating unit for interpolating the digital color component data of the image data signal converted by the conversion unit by a predetermined interpolation manner, a compression unit for compressing the digital color component data of the image data signal interpolated by the interpolating unit at a predetermined rate including a compression rate of 1/1, and a storage means for storing the compressed digital color component data of the image data signal by the compression unit in a digital recording medium.

Further, according to the present invention, there is provided an apparatus for processing image data signal which has moreover a data reading unit for reading the digital color component data of the image data signal from the recording medium, and an expansion unit for expanding the digital color component data of the image data signal read from the recording medium at a predetermined expansion rate, to reproduce expansion data substantially the same as the data before the compression, to thereby provide reproduction image picture data having a predetermined resolution.

Further, according to the present invention, there is provided a method of processing an image data signal formed by at least three color components, which include the steps of converting analog intensities of the color component data of the image data signal to digital intensity color component data, compressing the digital color component data of the converted image data signal at a predetermined rate including a compression rate of 1/1, and storing the compressed digital color component of the image data signal by the compression means to a digital recording medium.

Further, according to the present invention, there is provided the method of processing an image data signal which includes moreover the steps of reading the digital color component data of the image data signal from the recording medium, expanding the digital color component data of the image data signal read from the recording medium at a predetermined expansion rate to reproduce expansion data substantially the same as the data before the compression, and generating data interpolating the expanded digital color component data of the image data signal in a predetermined interpolation manner, to thereby provide reproduction image picture data having a predetermined resolution.

Further, according to the present invention, there is provided a method of processing an image data signal formed by at least three color components, which includes the steps of converting analog intensities of the color component data of the image data signal to digital intensity color component data, generating data interpolating digital color component data on the basis of the converted digital color component data of the image data signal in a predetermined interpolation manner, compressing the interpolated digital color component data of the image data signal at a predetermined rate including a compression rate of 1/1, and storing the compressed digital color component of the image data signal in a digital recording medium.

Further, according to the present invention, there is provided the method of processing an image data signal which includes moreover the steps of reading the digital color component data of the image data signal from the recording medium, and expanding the digital color component data of the image data signal read from the recording medium at a predetermined expansion rate, to reproduce expansion data substantially the same as the data before the compression, to thereby provide reproduction image picture having a predetermined resolution.

BRIEF DESCRIPTION OF THE DRAWINGS

The above objects and features and other objects and features of the present invention will become clearer by the following description with reference to accompanying drawings, wherein:

FIG. 2 is a view for explaining how three elementary colors can be generated by an imaging device of the image data processing apparatus in FIG. 1;

DESCRIPTION OF THE PREFERRED EMBODIMENTS

Figure 1:
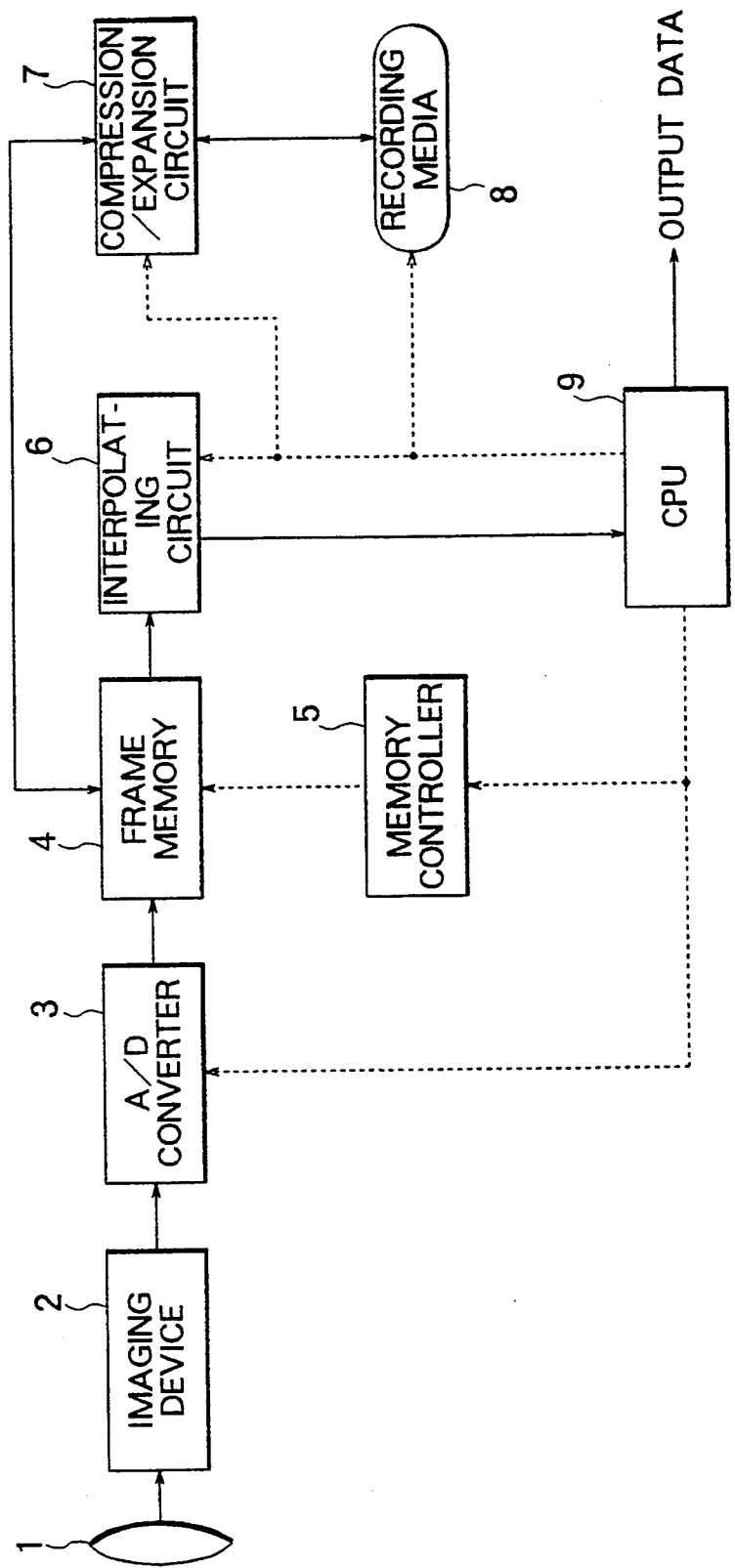
FIG. 1 is a block diagram showing a first embodiment of an image data processing apparatus according to the present invention.

FIG. 1 is a block diagram showing a first embodiment of an image data processing apparatus, built in a digital electronic still camera, according to the present invention.

In FIG. 1, 1 denotes an image formation lens, 2 an imaging device, 3 an analog/digital converter (A/D converter), 4 a frame memory, 5 a memory controller, 6 an interpolating circuit, 7 a data compression/expansion circuit, 8 a recording medium, and 9 a central processing unit (CPU).

The image formation lens 1 condenses light from an object not shown, and forms an image at an appropriate position of the imaging device 2.

The imaging device 2, for example, has a three plates type charge coupled device (CCD) which is provided with a plurality of R-CCDs, a plurality of G-CCDs, and plurality of B-CCDs, generates analog electric color signals of red(R), green(G), and blue(B), i.e., the three primary colors, according to a quantity (an intensity) of the received light, and outputs an analog image data on the basis of the intensity of the generated color signal.

As shown in FIG. 2, in the three plate type CCD imaging device 2 of this embodiment, the G-CCDs are arranged at positions offset from the lattice of the R-CCDs and the B-CCDs. Specifically, the G-CCDs are arranged so that the pixel portions are shifted by a half pitch from the registration position of the R-CCDs and B-CCDs the in both horizontal and the vertical directions. In this embodiment, the R-CCDs and the B-CCDs are arranged at the same positions. This technology is disclosed in, for example, Japanese Unexamined Patent Publication (Kokai) 2(1990)-177672.

The A/D converter 3 converts red color analog intensities of the image data signal, blue color analog intensities of the image data signal, and green color analog intensities of the image data signal which are obtained from the imaging device 2, to digital intensity signals.

The frame memory 4 stores the image data which is converted to the digital signals by the A/D converter 3. The data is subjected to an expansion process in the data compression/expansion circuit 7, under the control of the memory controller 5.

The interpolating circuit 6 performs interpolation on the basis of the shift of the digital image data G which had been offset in the horizontal and vertical directions, which was output from the data compression/expansion circuit 7 and stored in the frame memory 4. For example, when original image data of $(768 \times 480 \times 3)$ pixels and a memory size thereof is 1.08 megabytes, according to the interpolation, high definition image data of $(1536 \times 960 \times 3)$ pixels are obtained and a memory size thereof is 4.3 megabytes.

As shown in FIG. 2, the interpolating circuit 6 performs interpolation of the image data to produce image data arranged in spaces, each positioned between the red and blue image data position, and the green image data position.

In the compression process, the data compression/expansion circuit 7 compresses the original image data of $(768 \times 480 \times 3)$ pixels of 1.08 megabytes stored in the frame memory 4 in compression process, at a predetermined compression rate, for example 1/1 (no compression), 1/2, 1/3, 1/4 . . . The compressed image data is stored in the recording medium 8 under control of the CPU 9.

The compression in the compression/expansion circuit 7 uses, for example, a two-dimensional discrete cosine transformation (DCT).

In the DCT method, for example, the digital image data in the frame memory 4 is divided into a plurality of blocks of $N \times N$ pixels. The data in the block is subjected to the two dimensional DCT, and the $N \times N$ pixel data is converted to $N \times N$ DCT transformed pixel data. The $N \times N$ DCT transformed data is quantized using a predetermined quantization table at a different step size for each coefficient position. The quantized data is coded to result in the compressed data.

Also, in the expansion-interpolation process, the data compression/expansion circuit 7 expands the compressed image data read from the recording medium 8 under the control of the CPU 9 at a predetermined expansion rate to restore the original image data. The compressed image data is converted to a picture signal of a predetermined format, and stores the picture signal is stored in the frame memory 4.

The expansion process includes a process reverse of the above described DCT compression process.

The recording medium 8 records the image data compressed in the data compression/expansion circuit 7 under the control of the CPU 9 in the compression process. And in the expansion-interpolation process, the recorded image data is read from the recording medium, and output to the data compression/expansion circuit 7 under the control of the CPU 9.

Figure 3:
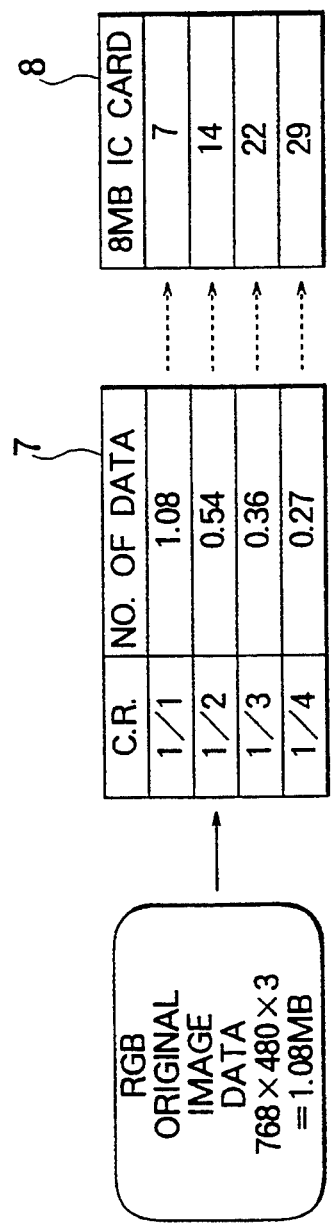
FIG. 3 is a view for explaining the relationship among a compression rate, the amount of compressed data, and the number of pictures recorded in a recording medium in the image data processing apparatus in FIG. 1.

FIG. 3 shows the relationship among a compression rate, the amount of compressed data, and the number of pictures recorded in the recording mediums, for example, an integrated circuit (IC) card which includes a microprocessor for signal processing and a semiconductor memory for storing the compressed image data. If the IC card is portable, and then the IC card can be loaded on another apparatus for reproducing the image data.

As shown in FIG. 3, since the digital image data is compressed at a predetermined compression rate in the compression/expansion circuit 7, it is possible to store the reduced digital compression image data to the IC card.

In the embodiment, since the compression is performed prior to the predetermined interpolation process, it is possible to increase the compression rate compared with compression after interpolating. Also, it is also possible to increase the number of pictures able to be stored in the IC card by increasing the compression rate.

The CPU 9 controls the transmission and reception of data between the frame memory and the data compression/expansion circuit 7 and between the compression-/expansion circuit 7 and the recording medium 8. Also, the CPU 9 converts the image data output from the interpolating circuit 6 to a high definition picture signal having a predetermined format and outputs the picture signal as RGB image data.

Figure 4:
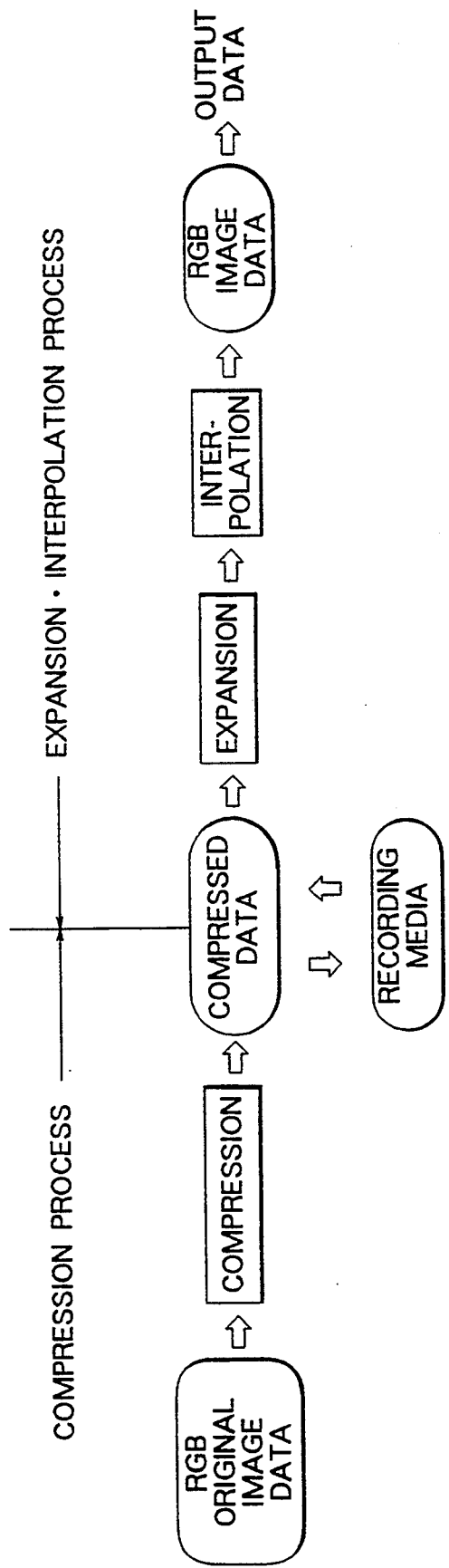
FIG. 4 is a view for explaining operations of the image data processing apparatus in FIG. 1.

Next, the operation by the above-described structure will by explained referring to FIG. 1 and FIG. 4.

Light from an object, not shown, is input to the image formation lens 1 and forms an image at an appropriate position of the imaging device 2. In the imaging device 2, a red color analog signal, blue color analog signal, and green color analog signal are generated according to the quantity (intensity) of the received light. These signals are subjected to a predetermined signal processing, and are output to the A/D converter 3 as the analog image data signal. As described above, the analog image data of the G-CCDs are shifted by a half pitch in the horizontal and vertical directions from a registration position of the R-CCDs and the B-CCDs.

In the A/D converter 3, the input red color analog image data, blue color analog image data, and green color analog image data are converted to red color digital image data, blue color digital image data, and green color digital image data, respectively. This digital image data is stored in the frame memory 4 as the RGB original image data.

The image data stored in the frame memory 4 of (768×480×3) pixels of 1.08 megabytes is read and output to the data compression/expansion circuit 7.

In the data compression/expansion circuit 7, the red color digital image data, the blue color digital image data, and the green color digital image data are subjected to a predetermined compression process at a predetermined compression rate, or are held as is, without compression when the compression rate is 1/1. The compressed or the non compressed image data are stored in the recording medium 8 under the control of the CPU 9.

When outputting the image data stored in the recording medium 8 to a display like a liquid crystal device or a printer, the desired red color digital image data, blue color image data, and green color image data are read from the appropriate recording areas of the recording medium 8 and output to the data compression/expansion circuit 7 under the control of the CPU 9.

In the data compression/expansion circuit 7, the compressed image data read from the recording medium 8 is expanded to restore it to the original image data at a predetermined expansion rate. The expanded image data is stored in the frame memory 4. The expanded image data stored in the frame memory 4 is read out and output to the interpolating circuit 6.

In the interpolating circuit 6, as the G data of the RGB original image data is shifted by a half pitch in the horizontal and vertical directions, the G data of the RGB original image data is subjected to interpolation on the basis of that shift, and then is output to the CPU 9 as image data of (1536×960×3) pixels of 4.3 megabytes.

In the CPU 9, the input image data is converted to picture signals having a predetermined format. The picture signals are output as RGB image data.

As explained above, according to the present embodiment, the electronic still camera obtains the analog pixel image data, converts the same to digital pixel image data, compresses the digital image data at a predetermined compression rate and stores the recording medium 8. In outputting the image data from the recording medium 8, the invention expands the stored image data, interpolate the expanded image data, and then output the interpolated image data. Due to this operation, it is possible to prevent the generation of jitter and the resultant color-stain and thus high resolution and high quality pictures are obtain.

Also, as the A/D converted image data is compressed directly, and the compressed image data is stored in the recording medium 8, therefore, when the IC card is used as the recording medium 8, it is possible to store a number of sets of image data on a single IC card and thus obtain a practical, broad-use apparatus.

Also, it is possible to perform interpolation of the digital image data, compress the interpolated digital image data, and then store the compressed image data in the recording medium 8. Alternatively, in the present embodiment, it is possible to increase the compression rate and, thereby reduce the time for the compression process, as compared with compression after interpolation.

It should be noted that, in the present embodiment, the imaging device required the the case of shifting of the positions of the pixels of three sets of CCD's in the horizontal and vertical directions as shown in FIG. 2 and the performing of a high definition signal process (interpolation process) to obtain high picture quality images. However, the present invention can be applied even to cameras with one or two set of CCD's by shifting the pixels in just one direction, such as the horizontal direction.

Also, in the present embodiment was explained using a DCT as the method at compression and an inverse DCT as the method of expansion. However, the present invention can also be applied to other a variety of coding and decoding methods for the compression and the expansion of data Further, the present embodiment was explained through the use of the IC card as the recording medium. However, the present invention can also be applied to a portable static memory card, a floppy disk, or other recording medium.

The present invention can also be applied even to the use of a portable recording medium, which can be loaded on another digital electronic still camera to move compressed digital image data and compression rate data thereon. When it is loaded in another electronic still camera, the compressed digital image data and compression rate data are read from the loaded recording medium. The read data is expanded in the data compression/expansion circuit at an expansion rate based on the stored compression rate data to reproduce expansion data substantially the same as the data before compression. The expanded data is interpolated in a predetermine interpolation manner to generate picture signals, and the picture signals are output as RGB image data.

Figure 5:
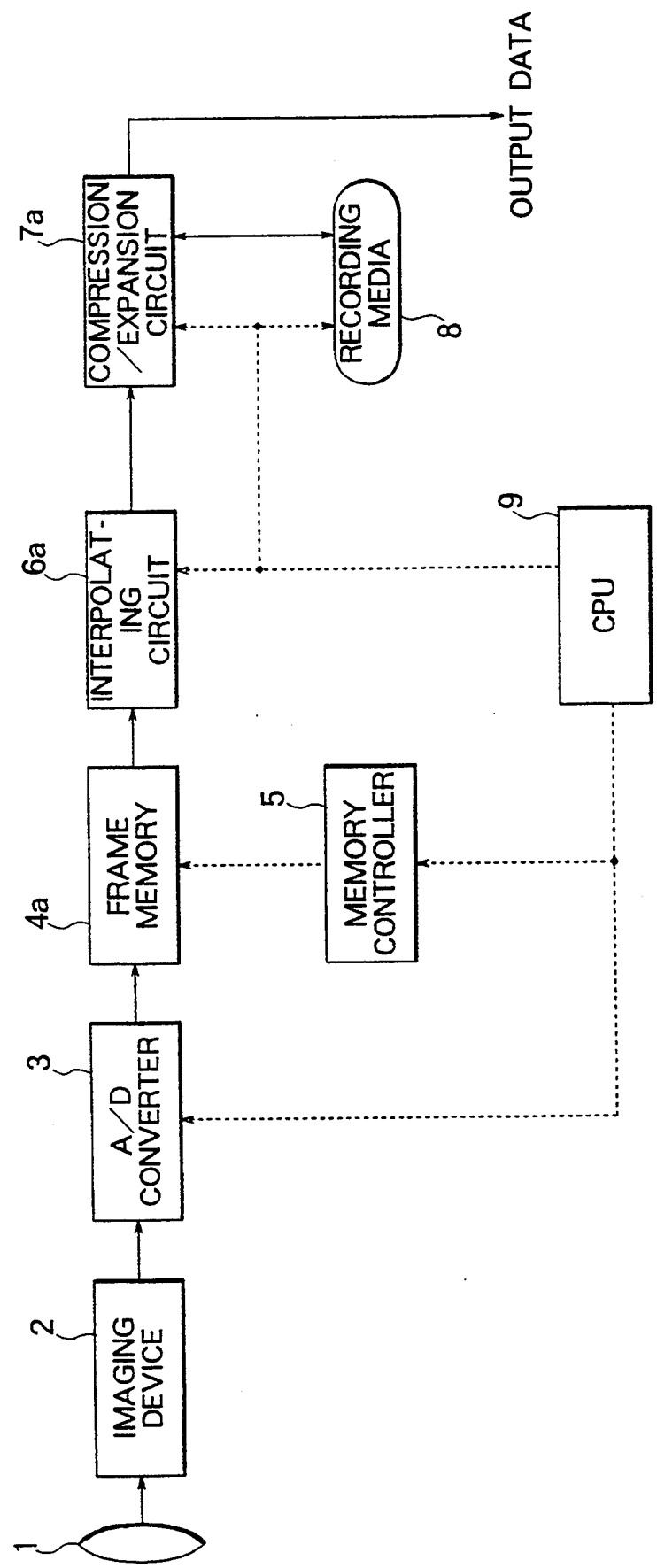
FIG. 5 is a block diagram showing a second embodiment of an image data processing apparatus according to the present invention.

FIG. 5 is a block diagram showing a second embodiment of an image data processing apparatus according to the present invention.

Note that, in FIG. 5, the reference numerals are the same as shown in FIG. 1 and indicate the same component of the apparatus. Therefore, explanation of these components is omitted.

The frame memory 4a stores image data converted to digital signals by the A/D converter 3 under the control of the memory controller 5.

The interpolating circuit 6a performs the interpolation to shift the digital image data G, output from the A/D converter 3 and stored in the frame memory 4a, the horizontal and vertical directions. Original image data of (768×480×3) pixels and 1.08 megabytes would thus obtain the high definition image data of (1536×960×3) pixels of 4.3 megabytes.

The interpolation in the interpolating circuit 6a is as same as in the interpolating circuit 6 in FIG. 1.

The data compression/expansion circuit 7a compresses the 4.3 megabyte image data which is interpolated in the interpolating circuit 6a, at a predetermined compression rate, for example, 1/4, 1/8, 1/12, 1/16 . . . The compressed image data is stored in the recording medium 8.

In the expansion process, the data compression/expansion circuit 7a expands the compressed image data read from the recording medium 8 under the control of the CPU 9 at a predetermined expansion rate to restore the original image data, converts the image data to picture signals of a predetermined format, and outputs the picture signals as the RGB image data.

The compression and expansion operation of the data compression/expansion circuit 7a is the same as the data compression/expansion circuit 7 in FIG. 1.

The recording medium 8 records the image data compressed in the data compression/expansion circuit 7a under the control of the CPU 9. In the expansion process, the recorded image data is read from the recording medium 8 and output to the data compression/expansion circuit 7a under the control of the CPU 9.

Figure 6:
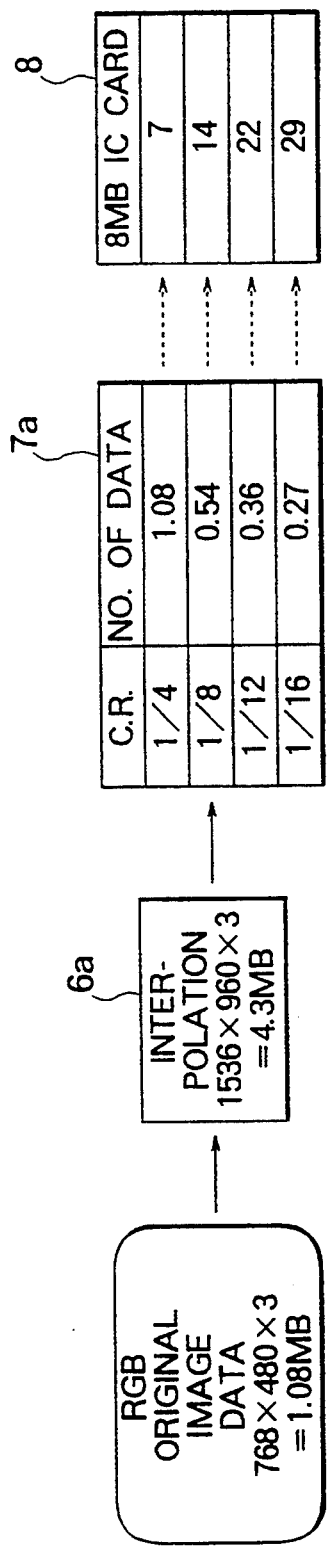
FIG. 6 is a view for explaining the relationship among a compression rate, the number of compressed data, and the amount of picture recorded in a recording media in the image data processing apparatus in FIG. 5.

FIG. 6 shows the relationship among a compression rate, the amount of compressed data and the number of pictures recorded in the recording medium 8, e.g., an 8 megabyte IC card.

As shown in FIG. 6, since the digital image data is compressed at a given compression rate in the compression/expansion circuit 7a and the compressed image data is recorded in the recording medium 8, it is possible to store a plurality of the picture data on the IC card. Also, it is possible to expand the quantity of picture data stored on the IC card by more increasing the compression rate.

Figure 7:
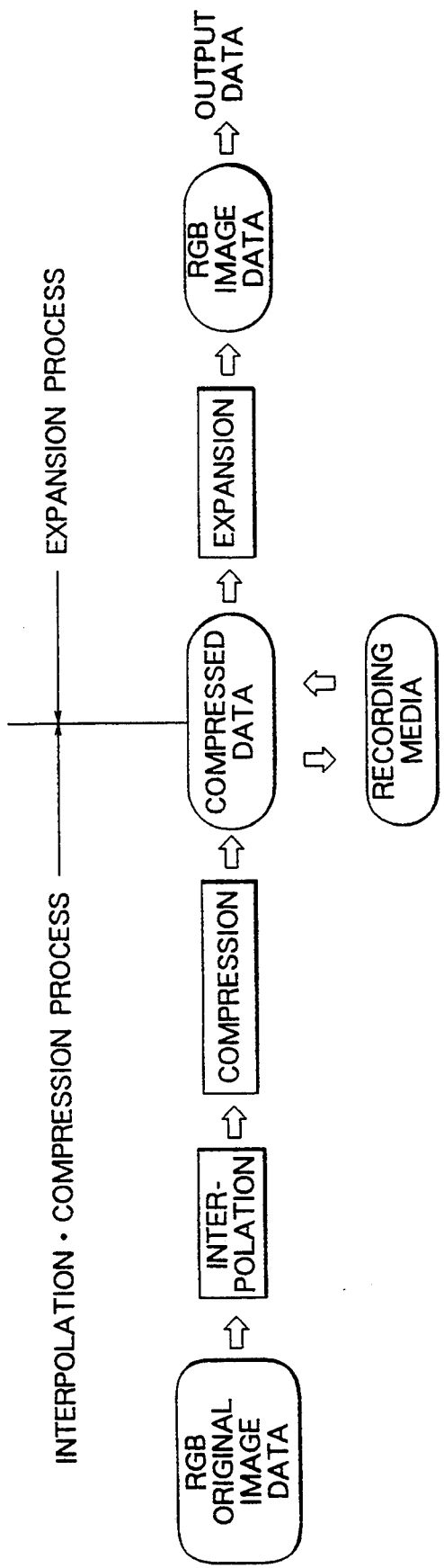
FIG. 7 is a view for explaining operations of the image data processing apparatus in FIG. 5.

Next, the operation by the above-described structure will be explained referring to FIG. 5 and FIG. 7.

Light from an object, not shown, is input to the image formation lens I and forms an image at an appropriate position of the imaging device 2. In the imaging device 2, a red color analog signal, blue color analog signal, and green color analog signal are generated according to the quantity (intensity) of light received. These signals are subjected to predetermined processing, and are output to the A/D converter 3 as the analog image data signal. As described above, these analog image data of the G-CCDs are shifted by a half pitch in the horizontal and vertical directions from the registration position of the R-CCDs and B-CCDs.

In A/D converter 3, the input red color analog image data, blue color analog image data, and green color analog image data are converted to red color digital image data, blue color digital image data, and green color digital image data, respectively. This digital image data 13 stored in the frame memory 4a as the RGB original image data.

The image data stored in the frame memory 4a of (768×480×3) pixels of 1.08 megabytes is read, and output to the interpolating circuit 6a.

In the interpolating circuit 6a, as the G's of the RGB original image data are shifted in the horizontal and vertical directions, the G's of RGB original image data are subjected to interpolation on the basis of the position shift, and then output to the data compression/expansion circuit 7a as image data of (1536×960×3) pixels of 4.3 megabytes.

In the data compression/expansion circuit 7a, the red color digital image data, the blue color digital image data, and the green color digital image data are subjected to a predetermined compression process at a predetermined compression rate. The compressed image data is stored in the recording medium 8 under the control of the CPU 9.

When outputting the image data stored in the recording medium 8 to a display like a liquid crystal device or a printer, the desired red color digital image data, blue color image data, and green color image data are read from the appropriate recording areas of the recording medium 8 and output to the data compression/expansion circuit 7a under the control of the CPU 9.

In the data compression/expansion circuit 7a, the compressed image data read from the recording medium 8 13 expanded to restore it to the original image data at a predetermined expansion rate. The expanded image data is converted to picture signals of a given format which are output as the RGB image data.

As explained above, according to the present embodiment, the electronic still camera produces the analog pixels image data, converts them to digital image data, interpolate the digital image data, and compresses the interpolated image data at a predetermined compression rate for storage. In the output operation, the invention expands the stored image data and then outputs it, Thereby, it is possible to prevent the generation of jitter and the resultant color-stain, and thus it is possible to obtain high resolution and high quality pictures.

Also, when the interpolated image data is compressed directly and the compressed image data is stored in the recording medium 8, such as an IC card, it is possible to store a plurality of image data on the IC card and thus is possible to obtain a practical, broad-use apparatus.

Note that, in the present embodiment explained, wherein the imaging device required the shifting of the pixels of three sets of CCD's in the horizontal and vertical directions and the performing of a high definition signal process (interpolation process) to obtain the high picture quality images. However, the present invention can be applied even to cameras with one or two sets of CCD's by shifting the pixels in just one directional, such as the horizontal direction.

Also, because the interpolated image data is compressed directly, and the compressed image data is stored in the recording means, such as an IC card, it is possible to store a plurality of image data on a IC card and is thus possible to obtain a practical, broad-use apparatus.

Many widely different embodiments of the present invention may be constructed without departing from the spirit and scope of the present invention, and it should be understood that the present invention is not restricted to the specific embodiments described above.

What is claim is:

1. An apparatus for processing an image data signal formed of at least three color components, each having an analog intensity, produced by an imaging means having first image generation elements and second image generation elements arranged at the same registration positions on a two dimensional plane, said first image generation elements and said second image generation elements being spaced at a predetermined pitch in two orthogonal directions, and third image generation elements arranged at positions shifted by a half pitch from the registration position of said first and second image generation elements in said two orthogonal directions, comprising:

conversion means for converting the analog intensities of said color components of said image data signal to digital color component data;

compression means for compressing said digital color component data at a predetermined rate greater than 1/1, whereby when said predetermined rate is 1/1 said image data signal is not compressed;

storage means for storing said compressed digital color component data on a digital recording medium;

data reading means for reading said digital color component data from said digital recording medium;

expansion means for expanding said digital color component data read from said digital recording medium at a predetermined expansion rate, to produce expanded data substantially the same as the digital color component data before compression; and interpolation means for interpolating at least one image data representing an intensity of an image generation element arranged between two adjacent image generation elements in a first direction and between two adjacent image generation elements in a second direction, said second direction being orthogonal to said first direction, by using said expanded digital color component data representing the intensities of said adjacent image generation elements to thereby provide reproduced image picture data having a predetermined resolution.

2. An apparatus according to claim 1, further comprising timing adjusting means for adjusting a timing of said interpolated color component data as a function of the positions of said first, second and third image generation elements.

3. An apparatus according to claim 1, further comprising picture reproduction means responsive to the interpolated image data for reproducing a picture substantially the same as an original picture.

4. An apparatus according to claim 1, wherein said compression means compresses said digital color component data as a function of the quantity of said image data.

5. An apparatus according to claim 1, wherein said compression means compresses said digital color component data as a function of the arrangement of said image generation elements.

6. An apparatus according to claim 1, wherein said digital recording medium comprises a static memory.

7. An apparatus according to claim 1, wherein said digital recording medium comprises a memory card.

8. An apparatus according to claim 1, wherein said storage means and said digital recording medium are integrated as an integrated circuit card.

9. An apparatus according to claim 1, wherein said expansion means expands said digital color component data as a function of the quantity of said image data.

10. An apparatus according to claim 1, wherein said expansion means expands said digital color component data as a function of the arrangement of said image generation elements.

11. An apparatus according to claim 1, wherein said three color components comprise red, green and blue color components.

12. An apparatus according to claim 11, wherein said first image generation elements and said second image generation elements generate red image data and blue image data, respectively, and said third image generation elements generate green image data.

13. An apparatus according to claim 1, wherein said apparatus is an electronic camera.

14. An apparatus according to claim 1, wherein said apparatus is an electronic still camera for processing substantially still image data.

15. An apparatus for processing digital color component image data derived from at least three color components, each having an analog intensity, produced by an imaging means having first image generation elements and second image generation elements arranged at the same registration positions on a two dimensional plane, said first image generation elements and said second image generation elements being spaced at a predetermined pitch in two orthogonal directions, and third image generation elements arranged at positions shifted by a half pitch from the registration position of said first and second image generation elements in said two orthogonal directions, the digital color component image data being recorded in compressed form on a digital recording medium, comprising:

data reading means for reading said compressed digital color component image data from said digital recording medium;

expansion means for expanding said digital color component image data read from said recording medium at a predetermined expansion rate, to produce expanded data substantially the same as the digital color component image data before compression; and interpolating means for interpolating at least one image data representing an intensity of an image generation element arranged between two adjacent image generation elements in a first direction and between two adjacent image generation elements in a second direction, said second direction being orthogonal to said first direction, by using said expanded digital color component image data representing the intensities of said adjacent image generation elements to thereby provide reproduced image picture having a predetermined resolution.

16. An apparatus according to claim 15, further comprising timing adjusting means for adjusting a timing of said interpolated color component data as a function of the positions of said first, second and third image generation elements.

17. An apparatus according to claim 15, further comprising picture reproduction means responsive to the interpolated data for reproducing a picture substantially the same as an original picture.

18. An apparatus according to claim 15, wherein said digital recording medium comprises a static memory.

19. An apparatus according to claim 15, wherein said digital recording medium comprises a memory card.

20. An apparatus according to claim 15, wherein said expansion means expands said digital color component image data as a function of the quantity of said image data.

21. An apparatus according to claim 15, wherein said expansion means expands said digital color component image data as a function of the arrangement of said image generation elements.

22. An apparatus according to claim 15, wherein said three color components comprise red, green and blue color components.

23. An apparatus according to claim 22, wherein said first image generation elements and said second image generation elements generate red image data and blue image data, respectively, and said third image generation elements generate green image data.

24. An apparatus according to claim 15, wherein compression rate data representing the compression of said recorded compressed digital color component image data are recorded on and read from said digital recording medium; and
    wherein said expansion means expands said digital color component image data read from said digital recording medium at an expansion rate determined by said compression rate data read from said digital recording medium.

25. An apparatus for processing an image data signal formed of at least three color components, each having an analog intensity, produced by an imaging means having first image generation elements and second image generation elements arranged at the same registration positions on a two dimensional plane, said first image generation elements and said second image generation elements being spaced at a predetermined pitch in two orthogonal directions, and third image generation elements arranged at positions shifted by half a pitch from the registration position of said first and second image generation elements in said two orthogonal directions, comprising:
    conversion means for converting the analog intensities of said color components of said image data signal to digital color component data;
    interpolation means for interpolating at least one image data representing an intensity of an image generation element arranged between two adjacent image generation elements in a first direction and between two adjacent image generation elements in a second direction, said second direction being orthogonal to said first direction, by using said digital color component data representing the intensities of said adjacent image generation elements;
    compression means for compressing said interpolated digital color component data at a predetermined rate greater than 1/1, whereby when said predetermined rate is 1/1 said image data signal is not compressed;
    storage means for storing said compressed digital color component data on a digital recording medium;
    data reading means for reading said digital color component data from said digital recording medium; and
    expansion means for expanding said digital color component data read from said digital recording medium at a predetermined expansion rate, to produce expanded data substantially the same as the digital color component data before compression.

26. An apparatus according to claim 25, further comprising timing adjusting means for adjusting a timing of said interpolated color component data as a function of the positions of said first, second and third image generation elements.

27. An apparatus according to claim 25, further comprising picture production means responsive to the expanded data for reproducing a picture substantially the same as an original picture.

28. An apparatus according to claim 25, wherein said compression means compresses said digital color component data as a function of the quantity of said image data.

29. An apparatus according to claim 25, wherein said compression means compresses said digital color component data as a function of the arrangement of said image generation elements.

30. An apparatus according to claim 25, wherein said digital recording medium comprises a static memory.

31. An apparatus according to claim 25, wherein said digital recording medium comprises a memory card.

32. An apparatus according to claim 25, wherein said storage means and said digital recording medium are integrated as an integrated circuit card.

33. An apparatus according to claim 25, wherein said expansion means expands said digital color component data as a function of the quantity of said image data.

34. An apparatus according to claim 25, wherein said expansion means expands said digital color component data as a function of the arrangement of said image generation elements.

35. An apparatus according to claim 25, wherein said three color components comprise red, green and blue color components.

36. An apparatus according to claim 35, wherein said first image generation elements and said second image generation elements generate red image data and blue image data, respectively, and said third image generation elements generate green image data.

37. An apparatus according to claim 25, wherein said apparatus is an electronic camera.

38. An apparatus according to claim 25, wherein said apparatus is an electronic still camera for processing substantially still image data.

39. An apparatus for processing an image data signal formed of at least three color components, each having an analog intensity, produced by an imaging means having first image generation elements and second image generation elements arranged at the same registration positions on a two dimensional plane, said first image generation elements and said second image generation elements being spaced at a predetermined pitch in two orthogonal directions, and third image generation elements arranged at positions shifted by a half pitch from the registration positions of said first and second image generation elements in said two orthogonal directions, comprising:

conversion means for converting the analog intensities of said color components of said image data signal to digital color component data;

interpolating means for interpolating at least one image data representing an intensity of an image generation element arranged between two adjacent image generation elements in a first direction and between two adjacent image generation elements in a second direction, said second direction being orthogonal to said first direction, by using said digital color component data representing the intensities of said adjacent image generation elements;

compression means for compressing said interpolated digital color component data at a predetermined rate greater than 1/1, whereby when said predetermined rate is 1/1 said image data signal is not compressed; and storage means for storing said compressed digital color component data on a digital recording medium.

40. An apparatus according to claim 39, further comprising timing adjusting means for adjusting a timing of said interpolated color component data as a function of the positions of said first, second and third image generation elements.

41. An apparatus according to claim 39, wherein said compression means compresses said digital color component data as a function of the quantity of said image data.

42. An apparatus according to claim 39, wherein said compression means compresses said digital color component data as a function of the arrangement of said image generation elements.

43. An apparatus according to claim 39, wherein said digital recording medium comprises a static memory.

44. An apparatus according to claim 39, wherein said digital recording medium comprises a memory card.

45. An apparatus according to claim 39, wherein said storage means and said digital recording medium are integrated as an integrated circuit card.

46. An apparatus according to claim 39, wherein said three color components comprise red, green and blue color components.

47. An apparatus according to claim 46, wherein said first image generation elements and said second image generation elements generate red image data and blue image data, respectively, and said third image generation elements generate green image data.

48. A method of processing an image data signal formed of at least three color components, each having an analog intensity, produced by an imaging means having first image generation elements and second image generation elements arranged at the same registration positions on a two dimensional plane, said first image generation elements and said second image generation elements being spaced at a predetermined pitch in two orthogonal directions, and third image generation elements being arranged at positions shifted by a half pitch from the registration position of said first and second image generation elements in said two orthogonal directions, comprising the steps of:

converting the analog intensities of said color components of said image data signal to digital intensity color component data;

compressing said digital color component data at a predetermined rate greater than 1/1, whereby when said predetermined rate is 1/1 said image data signal is not compressed;

storing said compressed digital color component on a digital recording medium;

reading said digital color component data from said digital recording medium;

expanding said digital color component data read from said digital recording medium at a predetermined expansion rate, to produce expanded data substantially the same as the digital color component data before compression; and interpolating at least one image data representing an intensity of an image generation element arranged between two adjacent image generation elements in a first direction and between two adjacent image generation elements in a second direction, said second direction being orthogonal to said first direction, by using said expanded digital color component data representing the intensities of said adjacent image generation elements to thereby provide reproduced image picture data having a predetermined resolution.

49. A method according to claim 48, further including the step of adjusting a timing of said interpolated color component data as a function of the positions of said first, second and third image generation elements.

50. A method according to claim 48, further including the step of responding to the interpolated image data to reproduce a picture substantially the same as an original picture.

51. A method of processing an image data signal formed of at least three color components, each having an analog intensity, produced by an imaging means having first image generation elements and second image generation elements arranged at the same registration positions on a two dimensional plane, said first image generation elements and said second image generation elements being spaced at a predetermined pitch in two orthogonal directions, and third image generation elements arranged at positions shifted by a half pitch from the registration position of said first and second image generation elements in said two orthogonal directions, comprising the steps of:

converting the analog intensities of said color components of said image data signal to digital color component data;

interpolating at least one image data representing an intensity of an image generation element arranged between two adjacent image data generation elements in a first direction and between two adjacent image generation elements in a second direction, said second direction being orthogonal to said first direction, by using said digital color component data representing the intensities of said adjacent image generation elements;

compressing said interpolated digital color component data at a predetermined rate greater than 1/1, whereby when said predetermined rate is 1/1 said image data signal is not compressed;

storing said compressed digital color component data on a digital recording medium;

reading said digital color component data from said recording medium; and expanding said digital color component data read from said digital recording medium at a predetermined expansion rate, to produce expanded data substantially the same as the digital color component data before compression, thereby providing image picture data having a predetermined resolution.

52. A method according to claim 51, further including the step of adjusting a timing of said interpolated color component data as a function of the positions of first, second and third image generation elements.

53. A method according to claim 51, further including the step of responding to said image picture data to produce a picture substantially the same as an original picture.

* * * * *